March 28, 1961 S. G. LUTZ 2,977,542

PUSH-PULL EXCITED RECOGNITION CIRCUIT

Filed Nov. 8, 1954 3 Sheets-Sheet 1

INVENTOR.
SAMUEL G. LUTZ.
BY
Henry Heyman
ATTORNEY.

March 28, 1961

S. G. LUTZ 2,977,542

PUSH-PULL EXCITED RECOGNITION CIRCUIT

Filed Nov. 8, 1954

3 Sheets-Sheet 2

SAMUEL G. LUTZ,
INVENTOR

BY [signature]
ATTORNEY

March 28, 1961 S. G. LUTZ 2,977,542

PUSH-PULL EXCITED RECOGNITION CIRCUIT

Filed Nov. 8, 1954 3 Sheets-Sheet 3

INVENTOR.
SAMUEL G. LUTZ,
BY
Henry Heyman
ATTORNEY.

United States Patent Office 2,977,542

Patented Mar. 28, 1961

2,977,542

PUSH-PULL EXCITED RECOGNITION CIRCUIT

Samuel Gross Lutz, Los Angeles, Calif., assignor to Hughes Aircraft Company, Culver City, Calif., a corporation of Delaware Filed Nov. 8, 1954, Ser. No. 467,330

11 Claims. (Cl. 328—108)

Figure 1:
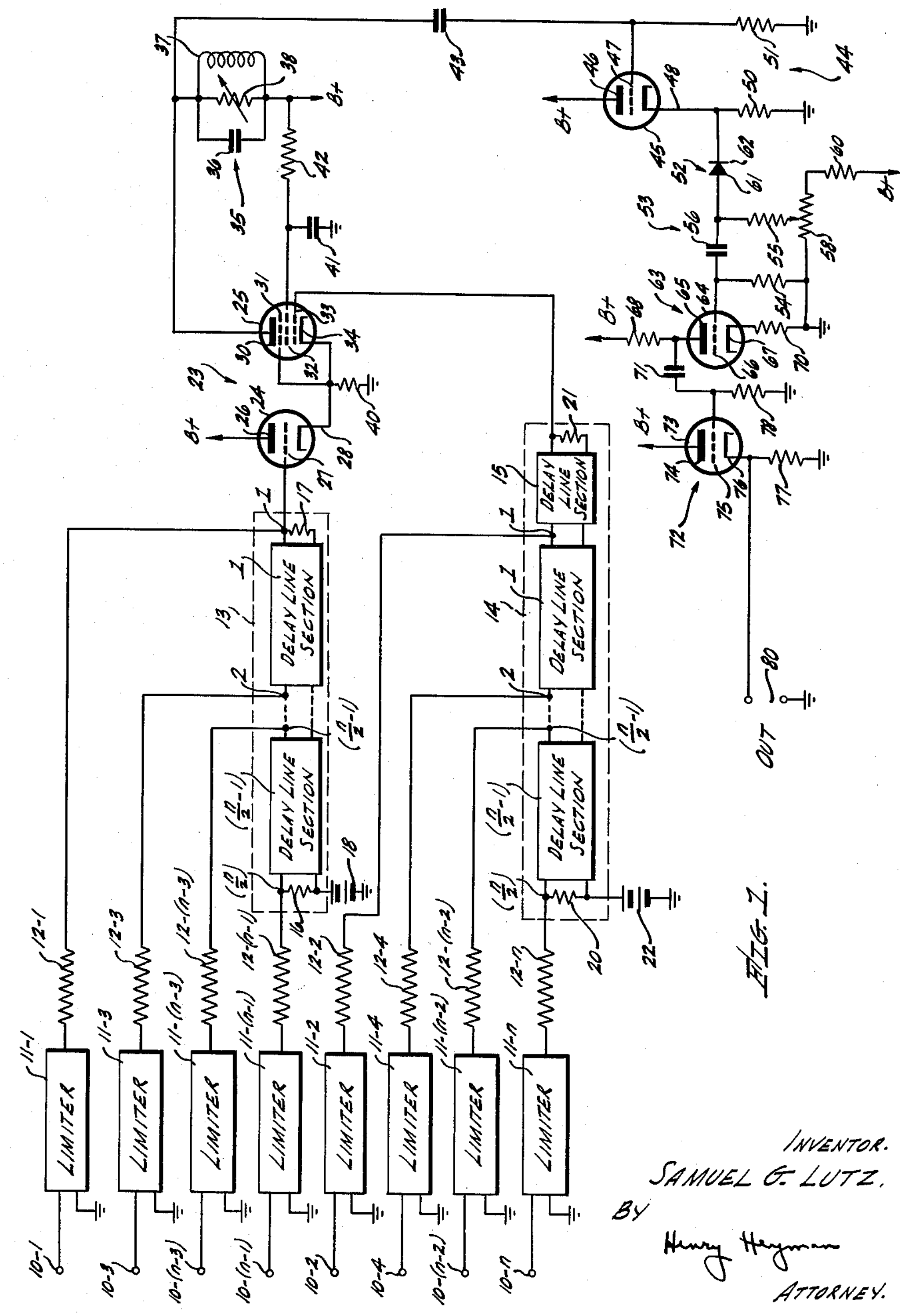

The present invention relates to recognition circuits for pulse code communication systems and more particularly to a resonant recognition circuit excited in push-pull for use in connection with a pulse code communication system that realiably distinguishes or recognizes the identifying signals prefixed to pulse coded messages from interference or noise signals encountered in the field of communications that may cause false recognition.

In copending U.S. patent application Serial No. 448,363 by John Everett Taber, for A Recognition Circuit for Pulse Code Communication Systems, filed on August 6, 1954, there is disclosed and claimed a recognition circuit that may be utilized in conjunction with high-speed pulse code communication systems requiring the use of message recording equipment. As stated therein, messages may be so brief and transmitted so infrequently that continuous recording under such low duty-cycle conditions would be economically impracticable. Accordingly, the recording equipment at the receiver is normally maintained inoperable or in stand-by readiness and the receiver is provided with a recognition circuit for starting the recording equipment in the event a desired message is received. The recognition circuit is preferably connected between the communication receiver and the recording equipment and is responsive to an identifying or recognition signal prefixed to the transmitted message for rendering the recording equipment operative.

As mentioned in the copending application, in order that the recognition circuit may initiate the operation of the recording equipment only when a desired message is received, the recognition circuit must be able to accurately discriminate between true recognition signals and interference signals, such as noise and keyed continuous wave signals, which could cause false recognition. Accordingly, recognition is based on characteristics of the recognition signals that, to a high degree of probability, are lacking in noise and other interference signals. One type of recognition signal suitable for this purpose is that in which pulses are repeated at prescribed intervals of time which may be made identical with the time relationship existing between the message pulse positions so that if the recognition signal is not received, the recognition circuit will nevertheless be responsive to the message pulses for starting the recording equipment.

According to one embodiment of the invention described in the above-mentioned copending application, a group of $n$ time-spaced pulses of equal amplitude and duration and representing a recognition signal is serially applied to a delay line network which delays each of the $n$ applied pulses to simultaneously produce a group of $n$ pulses at first and second instants of time, the second instant lagging the first instant by an interval of time equal to a pulse duration. Each group of $n$ pulses is linearly added to produce first and second output signals, the amplitude of each output signal being equal to the instantaneous sum of the amplitudes of the $n$ pulses multiplied by a reduction factor. The first and second output signals are then applied to the first and second input terminals, respectively, of a difference network which, in response thereto, produces a composite signal equal in amplitude to the instantaneous difference between the amplitudes of the first and second output signals multiplied by an amplification factor. Recognition is indicated by applying the composite signal to a threshold device which is biased to a voltage level less than the product of the reduction factor, the amplification factor, and the amplitude and a predetermined minimum number of pulses of the $n$ applied pulses.

This type of recognition circuit is particularly effective in preventing false recognition caused by pulsed carrier signals of relatively extended duration. In response to such pulsed carrier signals, demodulated pulses are applied to the recognition circuit which have substantially the same extended duration as the carrier signals. Each demodulated pulse is delayed for an interval of time equal to the duration of a recognition signal pulse, the original and delayed demodulated pulses being applied to the first and second input terminals, respectively, of the difference network. Since the difference network produces an output signal corresponding in amplitude to the instantaneous difference between the amplitudes of the demodulated pulses applied to its input terminals, the output signal has the same duration and, therefore, no greater effect than a single recognition pulse.

Another desirable feature of this type of recognition circuit is that it provides optimum discrimination against impulse and random noise signals that may be interpreted as a recognition signal. Protection against impulses of excessive amplitude is afforded by passing all signals applied to the recognition circuit through a limiter network which limits the amplitude of these signals to a predetermined voltage level so that no impulse will have any greater effect than any one recognition pulse. Furthermore, by linearly adding the $n$ simultaneously produced pulses as mentioned above, the corresponding noise signals of random amplitudes and phases will be combined on a R.M.S. basis and the signal-to-noise ratio will be improved by a factor $\sqrt{n}$. Accordingly, assuming a fixed average noise level and an adequate number of applied pulses, a threshold voltage level can be set which will almost never be reached by action of the random noise alone, even though, at any one instant, an applied pulse may be exceeded by the noise.

The present invention provides another type of recognition circuit which also is effective in preventing false recognition caused by interference signals and which may, therefore, be utilized in conjunction with high-speed pulse code communication system for rendering the associated recording equipment operative when a desired message is received. According to the basic concept of this invention, a resonant circuit is periodically energized in such a manner that the resonant circuit produces sinusoidal oscillations having exponentially increasing amplitudes. These oscillations are applied to a threshold device biased to a voltage level equal to the amplitude of the oscillation produced in response to a predetermined minimum number of pulses smaller than the number of pulses of the recognition signal. Recognition is indicated when the voltage level is exceeded by the amplitude of the oscillations.

More particularly, according to an embodiment of the present invention, a received identifying or recognition signal comprising $n$ groups of time spaced pulses having identical pulse repetition rates or frequencies, where $n$ represents any even integer, is acted upon in such a manner that two groups of time-spaced pulses of equal amplitude and duration and having identical pulse repetition frequencies are produced therefrom, the second of the two groups of pulses being delayed with respect to the first group of pulses by one-half the period of the pulses, where the period is the time interval between the leading edges of successive pulses in a group and is equal to the reciprocal of the pulse repetition frequency.

These first and second groups of pulses are applied in push-pull via first and second channels, respectively, to a parallel resonant circuit which is tuned to a frequency substantially equal to the pulse repetition frequency of the two groups of pulses. As a result, the resonant circuit is alternately excited positively and negatively by the pulses from the first and second channels, that is, in push-pull, to produce sinusoidal oscillations having exponentially increasing amplitudes. The oscillations are applied to a threshold device biased to a predetermined voltage level, and when the amplitude of the oscillations exceeds this voltage level, the recording equipment is actuated for recording the incoming message.

One attractive aspect of this push-pull resonant recognition system is that pulses occurring simultaneously on both channels produce equal but opposite, or cancelling, effects on the tuned circuits. Thus, push-pull drive affords protection against broadband steep-wave front interference which appear on both channels simultaneously. Furthermore, interfering signals keyed at the same repetition frequency as the pulses of the recognition signal and entering only one of the two channels build up the amplitude of the oscillations to only half the amplitude required for recognition so that the recording equipment remains inoperable. In fact, interference signals deviating in any way from the proper time sequence will produce less excitation of the tuned circuit and will, therefore, fail to build up the amplitude of the oscillations above the threshold voltage level selected for recognition.

Another attractive feature of the recognition circuit of the present invention is that the signal-to-noise ratio of the recognition signal is increased even under the most adverse conditions. Thus, for example, even if the amplitude of the desired recognition signal is below that of the random noise accompanying the signal, the "magnification" by Q in the tuned circuit, where Q is the ratio of energy stored in the tuned circuit to energy dissipated per cycle, can bring the recognition signal above the noise level sufficiently for reliable recognition. Viewed slightly differently, this can be explained by the frequency selectivity of the tuned circuit accepting the single-frequency fundamental component of the recognition signal and discriminating against the broad frequency band of the noise.

Still another attractive aspect of the recognition circuit of the present invention is that it avoids the use of the large number of bulky and expensive electrically long delay lines required by the recognition circuit of the above-mentioned copending application.

It is, therefore, an object of the present invention to provide a resonant recognition circuit for pulse code communication systems that produces an output pulse in response to at least a predetermined minimum number of pulses of $n$ applied groups of pulses.

Another object of the present invention is to provide a resonant recognition circuit energizable in push-pull for pulse code communication systems that produces an output pulse in response to at least a predetermined minimum number of recurrently applied pulses by exponentially increasing the amplitude of a sinusoidal oscillation beyond a predetermined threshold voltage level in response to at least the predetermined minimum number of recurrently applied pulses.

A further object of the present invention is to provide a resonant recognition circuit for pulse code communication systems that discriminates against interference pulses having a time-space sequence other than that of the pulses of the $n$ applied groups of pulses.

An additional object of the present invention is to provide a resonant recognition circuit for pulse code modulation communication systems that improves the signal-to-noise ratio of the applied pulses by selectively amplifying the single fundamental frequency component of the applied pulses and discriminates against the broad frequency band of the noise.

A still further object of the present invention is to provide a recognition circuit for pulse code communication systems that discriminates against broad-band steep wave-front interference signals and groups of simultaneously occurring interference pulses by simultaneously applying these interference signals and pulses to the resonant circuit in push-pull.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 2:
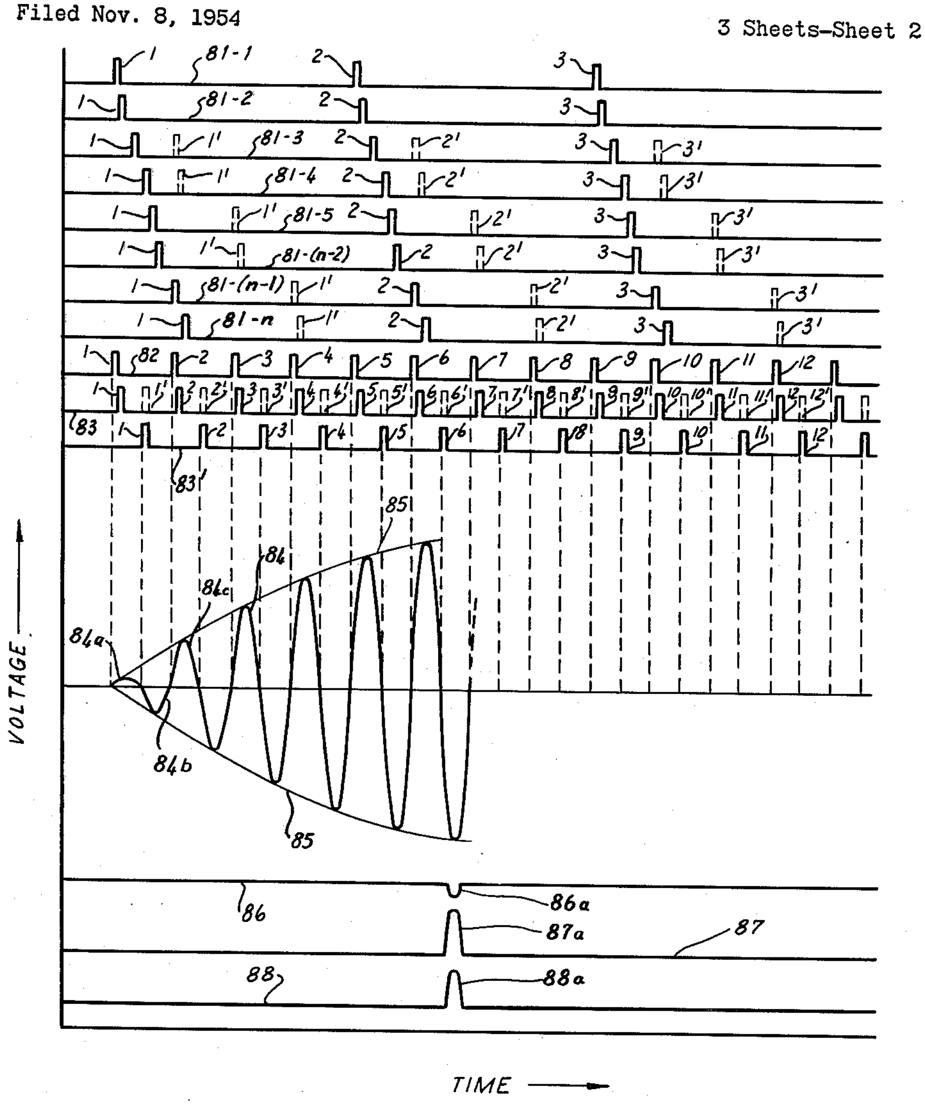
Figure 3:
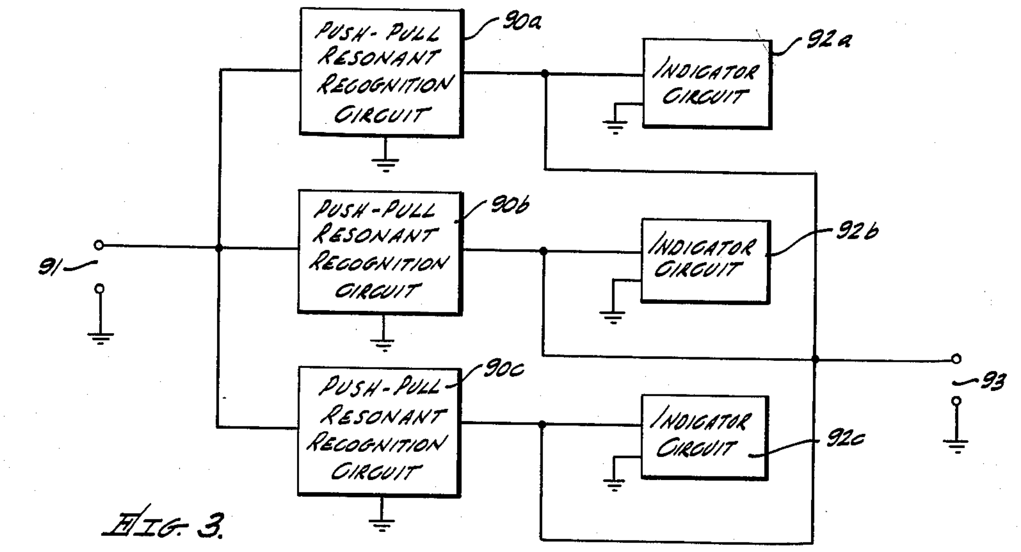
Figure 4:
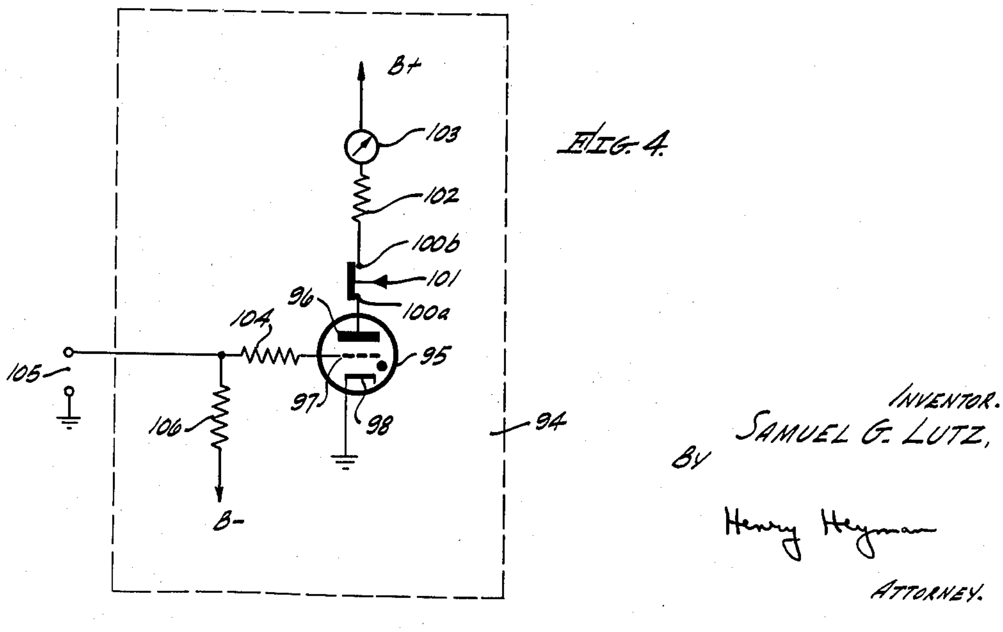

Fig. 1 is a circuit diagram, partly in block form, of a resonant recognition circuit for pulse code communication systems according to the present invention;

Fig. 2 contains graphs representing signals appearing at various points in the circuit of Fig. 1;

Fig. 3 is a block diagram of an array of push-pull resonant recognition circuits for pulse code communication systems according to the present invention; and Fig. 4 is a circuit diagram of an indicator circuit included in the array of Fig. 3.

Referring now to the drawings, there is shown in Fig. 1 a push-pull resonant recognition circuit, according to the present invention, for producing an output pulse in response to the application of an identifying or recognition signal comprising $n$ groups of time-spaced pulses of equal amplitude and duration and having identical pulse repetition frequencies, where $n$ represents any even integer. The recognition circuit comprises $n$ pairs of input terminals identified by 10–1, 10–2, 10–3, 10–4, 10–($n$–3), 10–($n$–2), 10–($n$–1), 10–$n$ for receiving the $n$ applied groups of pulses, respectively, one input terminal of each pair being grounded. For convenience, $n$ has been assumed to be 8 in Fig. 1. The ungrounded input terminals are connected to $n$ limiter networks 11–1 to 11–$n$, one connected to each ungrounded input terminal, for limiting the amplitude of the applied pulses to a fixed voltage level. Examples of limiters that may be used are found on pages 158 through 169 of Radar Electronic Fundamentals, Technical Manual 11–466, published by the War Department in June 1944.

Limiter networks 11–1 to 11–$n$ are connected through $n$ isolation resistors 12–1 to 12–$n$ to first and second delay line networks indicated by dotted rectangles 13 and 14, respectively, each delay line network comprising ($n$/2–1) delay line sections connected in tandem, the term section designating a length of delay line for obtaining a required time delay. Thus, for $n$=8, ($n$/2–1)=4–1=3 delay line sections. More specifically, the ($n$/2) odd-numbered limiters 11–1, 11–3, . . . 11–($n$–1) are connected through odd-numbered resistors 12–1, 12–3, . . . 12–($n$–1), respectively, to the ($n$/2–1) delay line sections of delay line network 13 and the ($n$/2) even-numbered limiters 11–2, 11–4, . . . 11–$n$ are connected through even-numbered resistors 12–2, 12–4, . . . 12–*n*, respectively, to the (*n*/2–1) delay line sections of delay line network 14. Resistors 12–1 to 12–*n* are provided to minimize intercoupling between limiter networks 11–1 to 11–*n* and the 2(*n*/2–1) delay line sections of delay line networks 13 and 14 in order to prevent distortion of the applied pulses that may result from such intercoupling.

Delay line network 14, in addition to the (*n*/2–1) delay line sections previously mentioned, also includes a delay line section 15 connected in tandem with the (*n*/2–1) delay line sections therein. More details both as to delay line section 15 and as to the 2(*n*/2–1) delay line sections of delay line networks 13 and 14 are presented below.

The (*j*)th delay line section of delay line network 13, where *j* is any integer from 1 through (*n*/2–1), has a time delay equal to the product of 2/*n* and the period of the applied pulses, minus the interval of time between the (2*j*–1)st group of pulses and the (2*j*+1)st group of pulses of the *n* applied groups of pulses. The (*k*)th delay line section of delay line network 14, where *k* is any integer from 1 through (*n*/2–1), has a time delay equal to the product of 2/*n* and the period of the applied pulses, minus the interval of time between the (2*k*)th group of pulses and the (2*k*+2)nd group of pulses of the *n* applied groups of pulses. An example of a delay line section that may be used is shown in Fig. 22·16 on page 746 of vol. 19 of the M.I.T. Radiation Laboratory Series, published in 1949 by the McGraw-Hill Book Company, Inc., New York, N.Y.

In order to delay the *n* applied groups of pulses by the intervals of time previously mentioned, each one of the *n* groups of pulses is applied to a different one of the delay line sections of delay line networks 13 and 14. Accordingly, each one of the delay line sections of delay line networks 13 and 14 is tapped at its input and output ends, the tap at the output end of each section but the last being connected directly to the tap at the input end of the immediately succeeding section. In other words, each one of delay line networks 13 and 14 is tapped at (*n*/2) points along the line, designated as taps 1, 2, (*n*/2–1), (*n*/2) in Fig. 1, the *n*/2 odd-numbered resistors 12–1, 12–3, . . . 12–(*n*–1) being connected to the (*n*/2) taps of delay line network 13 and the (*n*/2) even-numbered resistors 12–2, 12–4, . . . 12–*n* being connected to the (*n*/2) taps of delay line network 14, respectively.

As a result of the previously mentioned time delays experienced by the *n* groups of pulses applied to delay line networks 13 and 14, first and second composite groups of pulses are produced at the output terminals of networks 13 and 14, respectively, each one of the two composite groups of pulses having a pulse repetition frequency equal to (*n*/2) times the pulse repetition frequency of the *n* applied groups of pulses. Since it is desirable in the present invention to time space the first and second composite groups of pulses by an interval of time equal to one-half the period of the pulses of the composite groups of pulses, delay line network 14 includes, as previously mentioned, additional delay line section 15 which has a time delay equal to one-half the period of the composite group of pulses minus the interval of time between the first and second composite groups of pulses. In other words, tying in the delay time of delay line section 15 with the delay times of the other delay line sections of delay line networks 13 and 14, delay line section 15 has a time delay equal to the product of the fraction 1/*n* and the period of the pulses of the *n* applied groups of pulses, minus the interval of time between the first and second composite groups of pulses.

The (*n*/2–1) delay line sections of delay line network 13 are connected between a pair of matching resistors 16 and 17. Thus, resistor 16 is connected between the input terminals of the (*n*/2–1)st delay line section, one input terminal being connected to the positive terminal of a source of potential, such as a battery 18, having its negative terminal grounded as shown. Similarly, resistor 17 is connected between the output terminals of the 1st delay line section, one output terminal being connected through the delay line sections of delay line network 13 to the positive terminal of battery 18. The (*n*/2–1) delay line sections of delay line network 14 and additional delay line section 15 are also connected between a pair of matching resistors 20 and 21. Accordingly, resistor 20 is connected between the input terminals of the (*n*/2–1)st delay line section, one input terminal being connected to the positive terminal of a source of potential, such as a battery 22, having its negative terminal grounded as shown. Similarly, resistor 21 is connected between the output terminals of delay line section 15, one output terminal being connected through delay line section 15 and the delay line sections of delay line network 14 to the positive terminal of battery 22. Resistors 16 and 17 are provided to match the input and output impedances, respectively, of delay line network 13, while resistors 20 and 21 are provided to match the input and output impedances, respectively, of delay line network 14 and delay line section 15, thereby preventing reflections resulting from impedance mismatches and ensuring maximum transmission of power.

Delay line network 13 and additional delay line section 15 are connected to the first and second input terminals, respectively, of a cathode coupled amplifier generally designated 23. Amplifier 23 includes a triode 24 and a pentode 25, the triode comprising an anode 26, a control grid 27 and a cathode 28, and the pentode comprising an anode 30, a suppressor grid 31, a screen grid 32, a control grid 33 and a cathode 34. Anode 26 is connected directly to a source of positive potential indicated as B+, anode 30 also being connected to source B+ through a parallel resonant load circuit generally designated 35. Resonant load circuit 35 is energizable for producing sinusoidal oscillations at a frequency substantially equal to the pulse repetition frequency of the pulses of the composite groups of pulses and comprises a capacitor 36, an inductor 37, and an adjustable resistor 38 connected in parallel. Resistor 38 is utilized to provide a suitable Q for resonant circuit 35, where Q is a quality factor that characterizes the tuned circuit by determining the frequency selectivity and damping factor of the circuit.

Control grids 27 and 33 are the first and second input terminals, respectively, of amplifier 23 and are connected to delay line network 13 and delay line section 15, as previously mentioned. Cathodes 28 and 34 are connected directly to a grounded cathode resistor 40. Suppressor grid 31 is shorted to cathode 34 and screen grid 32 is coupled to ground through a capacitor 41, screen grid 32 also being connected through a resistor 42 to B+.

Anode 30 is coupled through a capacitor 43 to the input terminal of a cathode follower amplifier, generally designated 44. Cathode follower amplifier 44 basically comprises a triode 45 having an anode 46, a control grid 47, and a cathode 48, the anode being connected directly to source B+ and the cathode being connected through a resistor 50 to ground. Control grid 47 is the input terminal of amplifier 44 and, in addition to being connected to capacitor 43, is connected through a grid leak resistor 51 to ground.

Cathode 48 of cathode follower amplifier 44 is coupled through a rectifier, such as a crystal diode 52, to a resistance-capacitance coupling network, generally designated 53. Coupling network 53 comprises first and second resistors 54 and 55, respectively, and a capacitor 56, one end of resistors 54 and 55 being coupled to each other through capacitor 56. The other ends of resistors 54 and 55 are connected to a voltage-divider network 57 comprising as a rheostat 58 and a resistor 60 serially connected between source B+ and ground. More particularly, the other end of resistor 54 is grounded and the other end of resistor 55 is connected to the tap of rheostat 58. Crystal diode 52 comprises an anode 61 and a cathode 62, cathode 62 being connected to cathode 48 of cathode follower amplifier 44 and anode 61 being connected to the junction of resistor 55 and capacitor 56. It should be noted that crystal diode 52 is normally maintained in a back-biased state by cathode follower amplifier 44 and voltage-divider network 57, amplifier 44 applying a fixed direct-current potential $V_1$ to cathode 62 and voltage-divider network 57 applying a fixed direct-current potential $V_2$ to anode 61, potential $V_2$ being maintained lower than potential $V_1$ by a fixed predetermined differential.

The output end of coupling network 53 is connected to the input terminal of a voltage amplifier, generally designated 63, which comprises a triode 64 having an anode 65, a control grid 66, and a cathode 67. Anode 65 is connected to source B+ through an anode load resistor 68 and cathode 67 is connected to ground through a resistor 70. Control grid 66 is the input terminal of amplifier 63 and is connected to the junction of resistor 54 and capacitor 56 of coupling network 53. Anode 65 is also coupled through a capacitor 71 to the input terminal of a cathode follower amplifier, generally designated 72. Amplifier 72 comprises a triode 73 having an anode 74, a control grid 75, and a cathode 76, the anode being connected directly to source B+ and the cathode being connected through a resistor 77 to ground. Control grid 75 is connected through a grid leak resistor 78 to ground. Cathode 76 is also connected directly to an output terminal 80 of the push-pull resonant recognition circuit of the present invention.

In operation, *n* groups of pulses of equal amplitude and duration, as shown by wave forms 81–1 to 81–*n* of Fig. 2, are applied to input terminals 10–1 to 10–*n*, respectively, each group of pulses having the same predetermined pulse repetition frequency. For the sake of simplicity, that is, since the circuit of Fig. 1 shows only eight input terminals, only eight groups of pulses are shown in Fig. 2. Groups of pulses 81–1 to 81–*n* are applied through limiter networks 11–1 to 11–*n* and resistors 12–1 to 12–*n*, respectively, to delay line networks 13 and 14, odd-numbered groups of pulses, 81–1, 81–3, . . . 81–(*n*–1) being applied to delay line network 13 and even-numbered groups of pulses 81–2, 81–4, . . . 81–*n* being applied to delay line network 14. More particularly, the (*n*/2) odd-numbered groups of pulses 81–1, 81–3, . . . 81–(*n*–1) are applied to the (*n*/2) taps of delay line network 13 and the (*n*/2) even-numbered groups of pulses 81–2, 81–4, . . . 81–*n* are applied to the (*n*/2) taps of delay line network 14. Thus, for example, groups of pulses 81–1 and 81–3 are applied to taps 1 and 2, respectively, of delay line network 13 and groups of pulses 81–2 and 81–4 are applied to taps 1 and 2, respectively, of delay line network 14.

The odd-numbered groups of pulses are delayed by the (*n*/2–1) delay line sections of delay line network 13 for the intervals of time previously associated with these delay line sections to produce a first composite group of pulses having a pulse repetition frequency equal to (*n*/2) times the pulse repetition frequency of the applied groups of pulses, as shown by waveform 82 of Fig. 2. Stated differently, the odd-numbered groups of pulses 81–1, 81–3, . . . 81–(*n*–1) are delayed by the various delay line sections of delay network 13 to an extent indicated by the dotted pulses of waveforms 81–1, 81–3, . . . 81–(*n*–1). As a result, a composite group of pulses 82 is produced at tap 1 of delay line network 13, pulses 1, 2, 3, 4 of composite pulse group 82 corresponding to pulses 1 of odd-numbered pulse groups 81–1, 81–3, . . . 81–(*n*–1), respectively, pulses 5, 6, 7, 8 of pulse group 82 corresponding to pulses 2 of pulse groups 81–1, 81–3, . . . 81–(*n*–1), respectively, and pulses 9, 10, 11, 12 of pulse group 82 corresponding to pulses 3 of pulse groups 81–1, 81–3, . . . 81–(*n*–1), respectively.

Similarly, the even-numbered groups of pulses are delayed by the (*n*/2–1) delay line sections of delay line network 14 for the intervals of time previously associated with these delay line sections to produce a second composite group of pulses having a pulse repetition frequency also equal to (*n*/2) times the pulse repetition frequency of the applied groups of pulses, as shown by waveform 83. In other words, even numbered pulse groups 81–2, 81–4, . . . 81–*n* are delayed by the (*n*/2–1) delay line sections of delay line network 14 to an extent indicated by the dotted pulses of waveforms 81–2, 81–4, . . . 81–*n*. As a result, composite pulse group 83 is produced at tap 1 of delay line network 14, pulses 1, 2, 3, 4 of composite pulse group 83 corresponding to pulses 1 of applied pulse groups 81–2, 81–4, . . . 81–*n*, respectively, etc.

Composite group of pulses 83 produced at tap 1 of delay line network 14 is further delayed by delay line section 15 to produce another composite group of pulses, as shown by waveform 83′ in Fig. 2. More specifically, composite pulse group 83′ is produced by delaying pulse group 83 for an interval of time equal to one-half the period of the pulses of pulse group 82 minus the interval of time between the leading edges of the corresponding pulses in pulse groups 82 and 83. The extent to which pulse group 83 is delayed to produce pulse group 83′ is indicated by the dotted pulses of waveform 83′ in Fig. 2.

Composite groups of pulses 82 and 83′ are applied to control grids 27 and 33, respectively, of cathode coupled amplifier 23 and, in response thereto, parallel resonant load circuit 35 is alternately energized in push-pull to generate sinusoidal oscillations having a frequency substantially equal to the pulse repetition frequency of the pulses applied to the grids and having exponentially increasing amplitudes, as shown by waveform 84 of Fig. 2. More particularly, the application of pulse 1 of group of pulses 82 to control grid 27 produces a corresponding pulse of the same polarity across resistor 40, which has the effect of applying a pulse of opposite polarity to control grid 33 for energizing resonant load circuit 35 in a positive direction. On the other hand, the application of pulse 1 of group of pulses 83′ to control grid 33 energizes resonant load circuit 35 in a negative direction. Thus, sinusoidal loop 84*a* is generated in response to pulse 1 of group of pulses 82, sinusoidal loop 84*b* is generated in response to pulse 1 of group of pulses 83′, loop 84*c* is generated in response to pulse 2 of group of pulses 82, and so on, the amplitude of the sinusoidal loops increasing exponentially, as shown by asymptotes 85.

Sinusoidal oscillations 84 are applied to control grid 47 of cathode follower amplifier 44 which substantially reproduces the oscillations across resistor 50. As a result, the potential at cathode 62 of crystal diode 52 oscillates above and below the applied direct-current or steady state potential $V_1$ in accordance with the exponentially increasing amplitude of sinusoidal oscillations 84. When the potential at cathode 62 is reduced to a value below that of direct-current potential $V_2$ applied to anode 61, the back-bias on diode 52 is removed and the portion of the negative sinusoidal loop exceeding the differential $V_2$–$V_1$, as shown by pulse 86*a* of waveform 86 of Fig. 2, is passed by diode 52 and through coupling network 53 to control grid 66 of voltage amplifier 63. Pulse 86*a* is amplified and inverted by amplifier 63, as shown by pulse 87*a* of waveform 87, and then applied to control grid 75 of cathode follower amplifier 72. Amplifier 72 substantially reproduces pulse 87*a* across resistor 77, as shown by pulse 88*a* of waveform 88, and, in consequence thereof, pulse 88a is applied to output terminals 80.

In the preceding description, pulse 86a was produced only after 12 pulses had been applied to the first and second input terminals of cathode coupled amplifier 23, as shown by composite groups of pulses 82 and 83' of Fig. 2, and waveform 86 in the same figure. It should be noted, however, that a great deal of latitude exists in determining the number of pulses that must be applied to amplifier 23 to produce pulse 86a. Thus, by suitably adjusting either the Q of resonant load circuit 35 or potentials $V_1$ and $V_2$ at cathode 62 and anode 61, respectively, or both, any minimum predetermined number of pulses may be utilized to produce pulse 86a.

It should also be noted that the communication system associated with the recognition circuit of the present invention may include any odd or even number of channels for transmitting the message and that any even number of channels within the total number of channels employed in the system may be used for purposes of recognition. Thus, for example, in a communication system employing five channels for message transmission, any two or four of the five channels may be utilized for recognition.

An array of push-pull resonant recognition circuits of the type shown in Fig. 1, each circuit operating at a discrete resonant frequency, may be utilized to indicate whether the pulse repetition frequency of the *n* applied groups of pulses has deviated from a predetermined mean pulse repetition frequency. Although an array may include any number of push-pull resonant recognition circuits, depending upon the required degree of accuracy, to facilitate the description of such an array and to avoid confusion, an array has been illustrated in Fig. 3 comprising only three recognition circuits.

The array of Fig. 3 comprises three push-pull resonant recognition circuits 90a, 90b, 90c connected to a pair of input terminals 91 representing the *n* pairs of input terminals 10–1 through 10–*n* of Fig. 1, each one of recognition circuits 90a to 90c being operable at a discrete resonant frequency incrementally different from the others. Thus, recognition circuit 90b is operable at a mean resonant frequency $f_0$, while recognition circuits 90a and 90c are operable at resonant frequencies $f_1$ and $f_2$, respectively, frequencies $f_1$ and $f_2$ being higher and lower, respectively, than mean frequency $f_0$ by a fixed predetermined percentage of frequency $f_0$. Recognition circuits 90a to 90c are connected to three indicator circuits 92a to 92c, respectively, and to a single pair of output terminals 93, each indicator circuit being provided to indicate that the associated push-pull resonant recognition circuit has been excited.

One type of indicator circuit that may be utilized in the array of Fig. 3 is indicator circuit 94 shown in Fig. 4 which comprises a thyratron 95 having an anode 96, a control grid 97 and a cathode 98. Anode 96 is connected directly to a pair of terminals 100a and 100b shorted by means of a reset button 101. Terminal 100b is connected through a resistor 102 and an ammeter 103 to a source B+. Cathode 98 is grounded as shown and control grid 97 is connected through a resistor 104 to input terminals 105, one input terminal being grounded and the other input terminal being connected to resistor 104. The other input terminal is also connected through a resistor 106 to a source of negative potential indicated as B− which negatively biases thyratron 95 to normally maintain the thyratron non-conductive.

Considering the operation of the array of Fig. 3, *n* groups of pulses, such as groups of pulses 81–1 to 81–*n* of Fig. 2, are applied to input terminals 91 representing, for example, the *n* pairs of input terminals 10–1 to 10–*n* of Fig. 1. Assuming initially that the pulse repetition frequency of the applied pulses is substantially equal to the mean resonant frequency $f_0$ of recognition circuit 90b, recognition circuit 90b is excited in response to the *n* applied groups of pulses to produce an output pulse, such as output pulse 88a of Fig. 2, as previously explained in connection with the recognition circuit of Fig. 1. Output pulse 88a is applied both to output terminals 93 and to indicator circuit 92b which, in response thereto, is rendered operable to indicate that associated recognition circuit 90b is in operation.

A better understanding of the operation of indicator circuit 92b may be acquired by considering the operation of indicator circuit 94 shown in Fig. 4. When output pulse 88a is applied to input terminals 105 and from thence to control grid 97, thyratron 95 is triggered into operation and commences to conduct current which flows from source B+ through ammeter 103, resistor 102 and thyratron 95 to ground. As a result, ammeter 103 registers a current flow which indicates to an observer that the associated recognition circuit is in operation. To return indicator circuit 94 to its normally non-conducting state, reset button 101 is pushed, thereby disconnecting terminal 100a from terminal 100b and interrupting the flow of current through thyratron 95.

Referring again to Fig. 3, in the event that the pulse repetition frequency of the pulses applied to input terminals 91 is substantially equal to either of resonant frequencies $f_1$ or $f_2$ of recognition circuits 90a or 90c, respectively, either of recognition circuits 90a or 90c will be rendered operable as previously described and either indicator circuit 92a or 92c will give an indication of the operation of the associated recognition circuit. Thus, the array of push-pull resonant recognition circuits of Fig. 3 provides excellent means for indicating whether the pulse repetition frequency of the pulses composing the recognition signal has deviated from a required pulse repetition frequency and that steps should be taken to correct this condition.

What is claimed as new is:

1. A push-pull resonant recognition circuit for producing an output pulse in response to at least a predetermined minimum number of pulses of *n* applied groups of time-spaced pulses of substantially equal amplitude and duration, where *n* represents any even integer, said *n* groups of pulses having the same predetermined pulse repetition frequency, said circuit comprising: resonant circuit means energizable for producing sinusoidal oscillations at a frequency substantially equal to *n*/2 times the pulse repetition frequency; means for delaying each one of the *n* applied groups of pulses by a discrete interval of time to time-space each group of pulses from the immediately preceding group of pulses by an interval of time equal to one-half the period of said sinusoidal oscillations, said resonant circuit means being coupled to said means and energizable by successive ones of said delayed groups of pulses to produce oscillations having exponentially increasing amplitudes; and threshold means coupled to said resonant circuit means and biased to a voltage level a predetermined amount below the maximum amplitude of the oscillations produced by said resonant circuit means in response to the predetermined minimum number of pulses, said threshold means being responsive to the portion of the oscillations exceeding said voltage level for producing an output pulse.

2. A push-pull resonant recognition circuit for producing an output pulse in response to at least a predetermined minimum number of pulses of *n* applied groups of time-spaced pulses of substantially equal amplitude and duration, where *n* represents any even integer, said *n* groups of pulses having the same predetermined pulse repetition frequency, said circuit comprising: means for delaying the $(j)$th group of pulses, where $j$ is any integer from 1 through $n$, by an interval of time equal to $$\left(\frac{j-1}{n}\right)$$

times the period of the pulses minus the interval of time between the leading edge of a pulse in the $(j)$th group of pulses and the leading edge of a corresponding pulse in the first group of pulses; resonant circuit means energizable for producing electrical oscillations at a frequency substantially equal to $n/2$ times the pulse repetition frequency, said resonant circuit means being electrically coupled to said means and energizable by successive ones of said first and said delayed groups of pulses to produce oscillations having exponentially increasing amplitudes; and threshold means biased to a voltage level a predetermined amount below the maximum amplitude of the oscillations produced by said resonant circuit means in response to the predetermined minimum number of pulses, said threshold means being electrically coupled to said resonant means and responsive to the portion of the oscillations exceeding said voltage level for producing an output pulse.

3. A push-pull resonant recognition circuit for producing an output pulse in response to at least a predetermined minimum number of pulses of $n$ applied groups of time-spaced pulses of substantially equal amplitude and duration, where $n$ represents any even integer, said $n$ groups of pulses having a first predetermined pulse repetition frequency, said circuit comprising: first means for delaying each one of the applied odd-numbered groups of pulses by a discrete interval of time to produce a first composite group of pulses having a second pulse repetition frequency equal to $n/2$ times the first pulse repetition frequency; second means for delaying each one of the applied even-numbered groups of pulses by a discrete interval of time to produce a second composite group of pulses having said second pulse repetition frequency and lagging said first composite group of pulses by an interval of time equal to one-half the period of the pulses of said composite groups of pulses; resonant circuit means electrically coupled to said first and second means and energizable for producing sinusoidal oscillations at a frequency substantially equal to said second pulse repetition frequency, said resonant circuit means being energizable alternately by said first and second composite groups of pulses to produce oscillations having exponentially increasing amplitudes; and threshold means biased to a voltage level a predetermined amount below the maximum amplitude of the oscillations produced by said resonant circuit means in response to the predetermined minimum number of pulses, said threshold means being electrically coupled to said resonant means and responsive to the portion of the oscillations exceeding said voltage level for producing an output pulse.

4. The recognition circuit defined in claim 3 wherein said first means includes $(n/2-1)$ delay line sections connected in tandem for substantially equally time-spacing the applied odd-numbered groups of pulses, the $(j)$th section, where $j$ is any integer from 1 through $(n/2-1)$, having a time delay equal to the product of $2/n$ and the period of the applied pulses, minus the interval of time between the $(2j-1)$st group of pulses and the $(2j+1)$st group of pulses; and said second means includes $(n/2-1)$ delay line sections connected in tandem for substantially equally time spacing the applied even-numbered groups of pulses, the $(k)$th section, where $k$ is any integer from 1 through $(n/2-1)$, having a time delay equal to the product of $2/n$ and the period of the applied pulses, minus the interval of time between the $(2k)$th group of pulses and the $(2k+2)$nd group of pulses, said second means also including an additional delay line section connected in tandem with the associated $(n/2-1)$ delay line sections, said additional section having a time delay equal to one-half the period of the pulses of said composite groups of pulses minus the interval of time between said first and second composite groups of pulses.

5. The recognition circuit defined in claim 3 wherein said resonant circuit means includes a cathode-coupled amplifier having a parallel resonant load circuit energizable for producing said sinusoidal oscillations, said amplifier being alternately responsive to said first and second composite groups of pulses for alternately energizing in push-pull said resonant load circuit to produce said oscillations having exponentially increasing amplitudes.

6. The recognition circuit defined in claim 3 wherein said threshold means includes a diode having first and second terminals; means for applying said oscillations having exponentially increasing amplitudes to the first terminal of said diode; first biasing means electrically coupled to said first terminal for maintaining a first direct-current potential at said first terminal; and second biasing means electrically coupled to said second terminal for maintaining a second direct-current potential at said second terminal, the difference of potential between said first and second potentials being equal to said voltage level.

7. A push-pull resonant recognition circuit for producing an output pulse in response to at least a predetermined minimum number of pulses of $n$ applied groups of time-spaced pulses of substantially equal amplitude and duration, where $n$ represents any even integer, said $n$ groups of pulses having a first predetermined pulse repetition frequency, said circuit comprising: a first plurality of $(n/2-1)$ delay line sections connected in tandem for substantially equally time-spacing the applied odd-numbered groups of pulses to produce a first composite group of pulses having a second pulse repetition frequency equal to $n/2$ times the first pulse repetition frequency, the $(j)$th section, where $j$ is any integer from 1 through $(n/2-1)$, having a time delay equal to the product of $2/n$ and the period of the applied pulses, minus the interval of time between the $(2j-1)$st group of pulses and the $(2j+1)$st group of pulses; a second plurality of $(n/2-1)$ delay line sections connected in tandem for substantially equally time spacing the applied even-numbered groups of pulses to produce a second composite group of pulses having said second pulse repetition frequency, the $(k)$th section, where $k$ is any integer from 1 through $(n/2-1)$, having a time delay equal to the product of $2/n$ and the period of the applied pulses, minus the interval of time between the $(2k)$th group of pulses and the $(2k+2)$nd group of pulses; an additional delay line section connected in tandem with said second plurality of $(n/2-1)$ delay line sections for delaying said second composite group of pulses by an interval of time equal to one-half the period of the pulses of said composite groups of pulses minus the interval of time between said first and second composite groups of pulses, whereby said second composite group of pulses legs said first composite group of pulses by an interval of time equal to one-half the period of the pulses of said composite groups of pulses; a cathode-coupled amplifier electrically coupled to said first plurality of delay line sections and to said additional delay line section and having a parallel resonant load circuit energizable for producing sinusoidal oscillations at a frequency substantially equal to said second pulse repetition frequency, said amplifier being alternately responsive to said first and second composite groups of pulses for alternately energizing said resonant load circuit in push-pull to produce oscillations having exponentially increasing amplitudes; and threshold means electrically coupled to said resonant load circuit and biased to a voltage level a predetermined amount below the maximum amplitude of the oscillation produced in response to the predetermined minimum number of pulses, said threshold means being responsive to the portion of the oscillations exceeding said voltage level for producing an output pulse.

8. A push-pull resonant recognition circuit for producing an output pulse in response to at least a predetermined minimum number of pulses of $n$ applied groups of time-spaced pulses of substantially equal amplitude and duration, where $n$ represents any even integer, said $n$ groups of pulses having a first predetermined pulse repetition frequency, said circuit comprising: a first plurality of $(n/2-1)$ delay line sections connected in tandem for substantially equally time-spacing the applied odd-numbered groups of pulses to produce a first composite group of pulses having a second pulse repetition frequency equal to $n/2$ times the first pulse repetition frequency, the $(j)$th section, where $j$ is any integer from 1 through $(n/2-1)$, having a time delay equal to the product of $2/n$ and the period of the applied pulses, minus the interval of time between the $(2j-1)$st group of pulses and the $(2j+1)$st group of pulses; a second plurality of $(n/2-1)$ delay line sections connected in tandem for equally time spacing the applied even-numbered groups of pulses to produce a second composite group of pulses having said second pulse repetition frequency, the $(k)$th section, where $k$ is any integer from 1 through $(n/2-1)$, having a time delay equal to the product of $2/n$ and the period of the applied pulses, minus the interval of time between the $(2k)$th group of pulses and the $(2k+2)$nd group of pulses; an additional delay line section connected in tandem with said second plurality of $(n/2-1)$ delay line sections for delaying said second composite group of pulses by an interval of time equal to one-half the period of the pulses of said composite groups of pulses minus the interval of time between said first and second composite groups of pulses, whereby said second composite group of pulses legs said first composite group of pulses by an interval of time equal to one-half the period of the pulses of said composite groups of pulses; resonant circuit means electrically coupled to said first plurality of delay line sections and said additional delay line section and energizable for producing sinusoidal oscillations at a frequency substantially equal to said second pulse repetition frequency, said resonant circuit means being energizable alternately in push-pull by said first and second composite groups of pulses to produce oscillations having exponentially increasing amplitudes; a diode having first and second terminals; means for applying said oscillations having exponentially increasing amplitudes to the first terminal of said diode; first biasing means electrically coupled to said first terminal for maintaining a first direct-current potential at said first terminal; and second biasing means electrically coupled to said second terminal for maintaining a second direct-current potential at said second terminal, the difference of potential between said first and second potentials being a predetermined amount below the maximum amplitude of the oscillations produced by said resonant load circuit in response to the predetermined minimum number of pulses.

9. A push-pull resonant recognition circuit for producing an output pulse in response to at least a predetermined minimum number of pulses of $n$ applied groups of time-spaced pulses of substantially equal amplitude and duration, where $n$ represents any even integer, said $n$ groups of pulses having a first predetermined pulse repetition frequency, said circuit comprising: first means for delaying each one of the applied odd-numbered groups of pulses by a discrete interval of time to produce a first composite group of pulses having a second pulse repetition frequency equal to $n/2$ times the first pulse repetition frequency; second means for delaying each one of the applied even-numbered groups of pulses by a discrete interval of time to produce a second composite group of pulses having said second pulse repetition frequency and lagging said first composite group of pulses by an interval of time equal to one-half the period of the pulses of said composite groups of pulses; a cathode-coupled amplifier electrically coupled to said first and second means and having a parallel resonant load circuit energizable for producing sinusoidal oscillations at a frequency substantially equal to said second pulse repetition frequency, said amplifier being alternately responsive to said first and second composite groups of pulses for alternately energizing said resonant load circuit in push-pull to produce oscillations having exponentially increasing amplitudes; a diode having first and second terminals; means for applying said oscillations having exponentially increasing amplitudes to the first terminal of said diode; first biasing means electrically coupled to said first terminal for maintaining a first direct-current potential at said first terminal; and second biasing means electrically coupled to said second terminal for maintaining a second direct-current potential at said second terminal, the difference of potential between said first and second potentials being a predetermined amount below the maximum amplitude of the oscillations produced in response to the predetermined minimum number of pulses.

10. A push-pull resonant recognition circuit for producing an output pulse in response to at least a predetermined minimum number of pulses of $n$ applied groups of time-spaced pulses of substantially equal amplitude and duration, where $n$ represents any even integer, said $n$ groups of pulses having a first predetermined pulse repetition frequency, said circuit comprising: a first plurality of $(n/2-1)$ delay line sections connected in tandem for substantially equally time-spacing the applied odd-numbered groups of pulses to produce a first composite group of pulses having a second pulse repetition frequency equal to $n/2$ times the first pulse repetition frequency, the $(j)$th section, where $j$ is any integer from 1 through $(n/2-1)$, having a time delay equal to the product of $2/n$ and the period of the applied pulses, minus the interval of time between the $(2j-1)$st group of pulses and the $(2j+1)$st group of pulses; a second plurality of $(n/2-1)$ delay line sections connected in tandem for substantially equally time-spacing the applied even-numbered groups of pulses to produce a second composite group of pulses having said second pulse repetition frequency, the $(k)$th section, where $k$ is any integer from 1 through $(n/2-1)$, having a time delay equal to the product of $2/n$ and the period of the applied pulses, minus the interval of time between the $(2k)$th group of pulses and the $(2k+2)$nd group of pulses; an additional delay line section connected in tandem with said second plurality of $(n/2-1)$ delay line sections for delaying said second composite group of pulses by an interval of time equal to one-half the period of the pulses of said composite groups of pulses minus the interval of time between said first and second composite groups of pulses, whereby said second composite group of pulses lags said first composite group of pulses by an interval of time equal to one-half the period of the pulses of said composite groups of pulses; a cathode-coupled amplifier electrically coupled to said first plurality of delay line sections and to said additional delay line section and having a parallel resonant load circuit energizable for producing sinusoidal oscillations at a frequency substantially equal to said second pulse repetition frequency, said amplifier being alternately responsive to said first and second composite groups of pulses for alternately energizing said resonant load circuit in push-pull to produce oscillations having exponentially increasing amplitudes; a diode having first and second terminals; means for applying said oscillations having exponentially increasing amplitudes to the first terminal of said diode; first biasing means electrically coupled to said first terminal for maintaining a first direct-current potential at said first terminal; and second biasing means electrically coupled to said second terminal for maintaining a second direct-current potential at said second terminal, the difference of potential between said first and second potentials being a predetermined amount below the maximum amplitude of the oscillations produced in response to the predetermined minimum number of pulses.

11. In combination, $n$ pairs of input terminals for receiving $n$ groups of pulses, respectively, where $n$ represents any even integer, said groups of pulses having a pulse repetition frequency within a range of pulse repetition frequencies; a pair of output terminals; a plurality of push-pull resonant recognition circuits connected in parallel between said $n$ pairs of input terminals and said pair of output terminals, each one of said recognition circuits being operable in response to said $n$ groups of pulses at a discrete one of the pulse repetition frequencies within said range for producing an output pulse at said pair of output terminals; and a corresponding plurality of indicator circuits connected to said plurality of recognition circuits, respectively, each one of said indicator circuits being responsive to the output pulse produced by the associated recognition circuit for indicating that said associated recognition circuit has been rendered operable, thereby to indicate the pulse repetition frequency of said groups of pulses.

No references cited.